(12) United States Patent
Andress

(10) Patent No.: US 6,697,639 B2
(45) Date of Patent: Feb. 24, 2004

(54) SWITCH WITH INTEGRATED MICROPHONE APERTURE FOR A HANDHELD COMPUTER

(75) Inventor: Scott R. Andress, Sunnyvale, CA (US)

(73) Assignee: Palm, Inc., Santa Clara, CA (US)

( * ) Notice: Subject to any disclaimer, the term of this patent is extended or adjusted under 35 U.S.C. 154(b) by 511 days.

(21) Appl. No.: 09/785,691

(22) Filed: Feb. 16, 2001

(65) Prior Publication Data

US 2002/0115472 A1 Aug. 22, 2002

(51) Int. Cl.[7] ................................................. H04Q 7/32
(52) U.S. Cl. ............................... 455/556.1; 455/556.2; 455/575.1; 455/557; 455/90.3; 379/433.01; 379/433.07
(58) Field of Search .............................. 455/550.1, 556, 455/557, 575.1, 90.3, 556.1, 556.2; 379/433.03, 433.01, 433.07, 368; 345/727, 864, 156, 160, 168, 169; 710/67, 73, 74

(56) References Cited

U.S. PATENT DOCUMENTS 6,108,416 A * 8/2000 Collin et al. ........... 379/433.01

FOREIGN PATENT DOCUMENTS

HK  2087686 A * 10/1980
JP  60136457 A * 7/1985

OTHER PUBLICATIONS

Handspring: Products: Springboard Modules: VisorPhone: Overview, 2 pps., printed on Jan. 25, 2001 from the Website located at http://www.handspring.com/products/visorphone/index.jhtml.

Handspring: Visor Platinum, 4 pps., printed on Jan. 25, 2001 from the Website located at http://www.handspring.com/products/visorplatinum/details.jhtml.

Handspring: Visor Platinum, 1 pp., printed on Jan. 25, 2001 from the Website located at http://www.handspring.com/products/visorplatinum/photos.jhtml.

Handspring: Visor Platinum, 1 pp., printed on Jan. 25, 2001 from the Website located at http://www.handspring.com/products/visorplatinum/photos2.jhtml.

Handspring: Visor Platinum, 1 pp., printed on Jan. 25, 2001 from the Website located at http://www.handspring.com/products/visorplatinum/photos3.jhtml.

Handspring: Visor Platinum, 1 pp., printed on Jan. 25, 2001 from the Website located at http://www.handspring.com/products/visorplatinum/photos4.jhtml.

Handspring: Visor Platinum, 1 pp., printed on Jan. 25, 2001 from the Website located at http://www.handspring.com/products/visorplatinum/photos5.jhtml.

* cited by examiner

Primary Examiner—William Trost
Assistant Examiner—Keith Ferguson
(74) Attorney, Agent, or Firm—Foley & Lardner

(57) ABSTRACT

A handheld computer is disclosed. The handheld computer includes a housing, computing electronics supported by the housing, and a display supported by the housing and electrically coupled to the computing electronics. The handheld computer includes a switch supported by the housing and electrically coupled to the computing electronics. A microphone aperture is disposed in the switch.

A rocker switch is also disclosed. The rocker switch is configured to be used in a handheld computer. The rocker switch includes a first button portion associated with a first button direction and a second button portion associated with a second button direction. The rocker switch includes a microphone aperture disposed in the rocker switch.

23 Claims, 1 Drawing Sheet

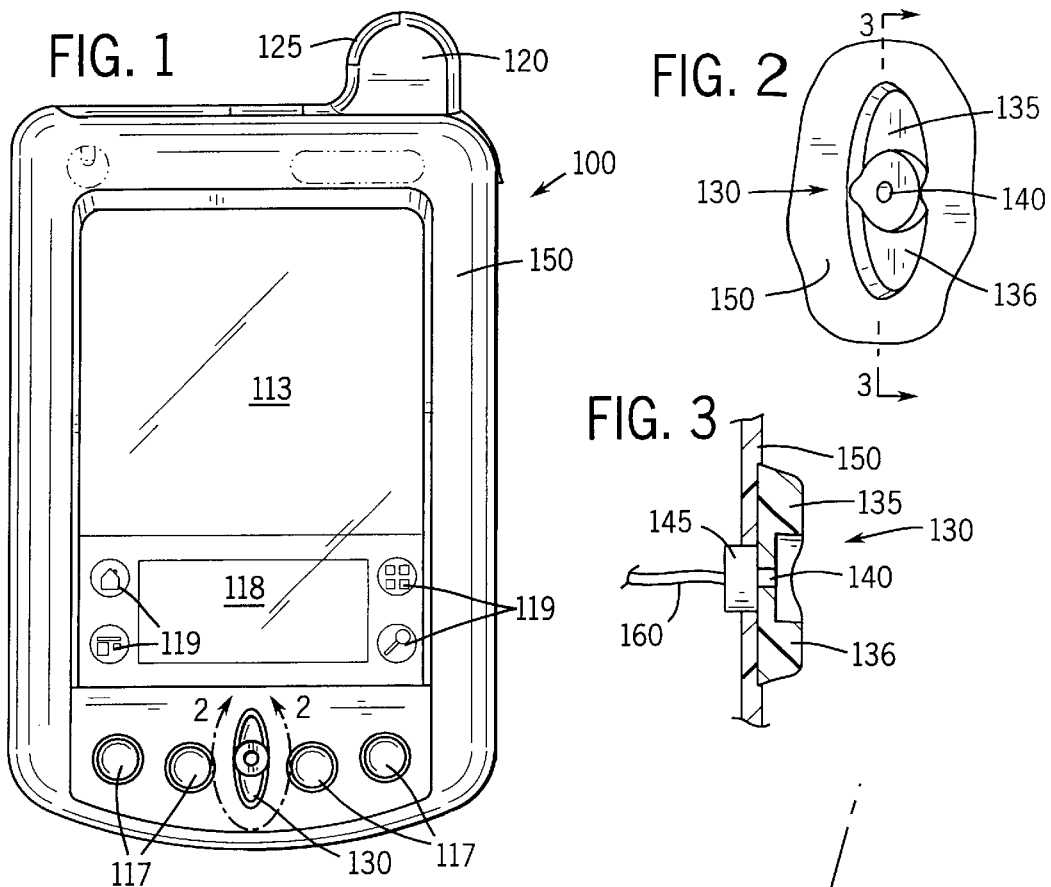
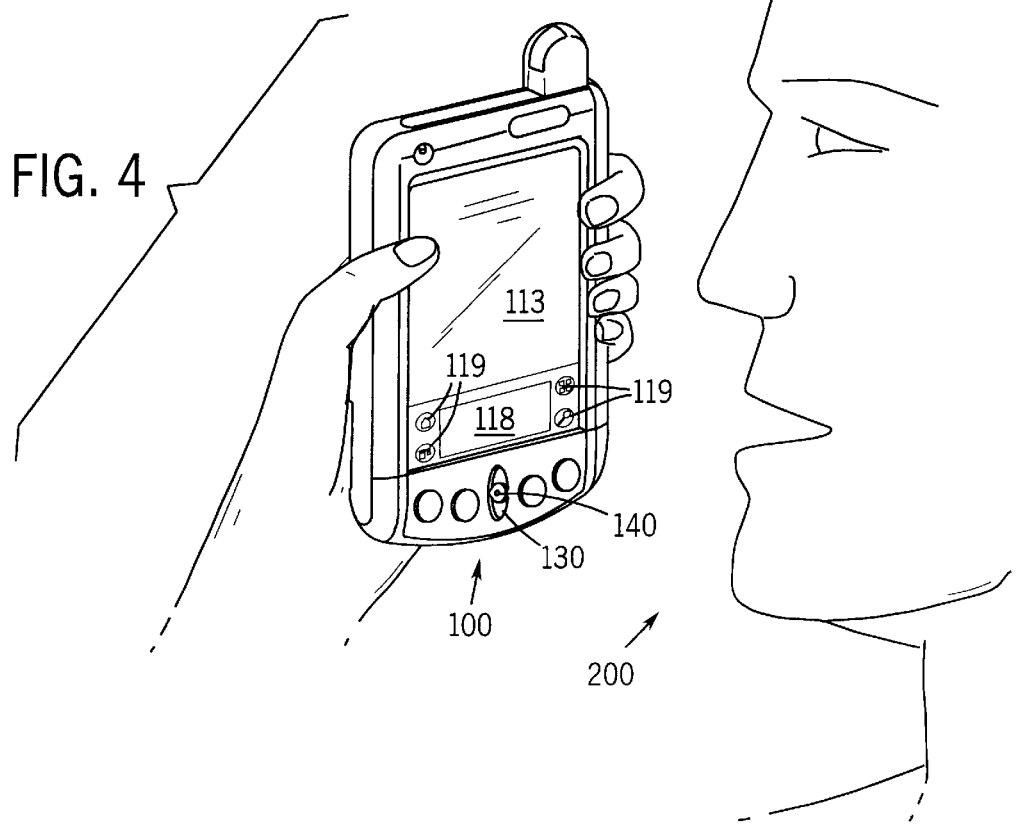

SWITCH WITH INTEGRATED MICROPHONE APERTURE FOR A HANDHELD COMPUTER

FIELD OF THE INVENTION

The invention relates to input devices typically used in handheld computing devices. In particular, the invention relates to a switch with an integrated microphone aperture. The switch may be a rocker type switch with an integrated microphone aperture for a handheld computer and/or telephony device.

BACKGROUND OF THE INVENTION

Handheld computing devices, "palmtops", "palmhelds", personal digital assistants (PDAs), or handheld computers typically weigh less than a pound and fit in a pocket. These handhelds generally provide some combination of personal information management, database functions, word processing, and spreadsheets as well as voice memo recording and telephony functions. Because of the small size and portability of handhelds, strict adherence to hardware constraints, such as input hardware, must be maintained. It is conventional to have buttons or switches on the handheld computer for providing user input to the handheld computer. Further, the buttons may be configured to be used for navigating through application software. Sound input apertures and microphones are conventionally located at some discrete location on the handheld computer housing, if included at all, using precious housing real estate on the handheld computer.

Other conventional implementations of sound input devices for handheld computers include external microphone devices that may be plugged into an electrical connector.

Accordingly, there is a need for a switch with an integrated microphone aperture for a handheld computer. Further, there is a need for an integrated microphone aperture for a handheld computer which does not require an external microphone or require extra housing real estate on the handheld computer.

The teachings herein below extend to those embodiments which fall within the scope of the appended claims, regardless of whether they accomplish one or more of the above mentioned needs.

SUMMARY OF THE INVENTION

An exemplary embodiment relates to a handheld computer. The handheld computer includes a housing, computing electronics supported by the housing, and a display supported by the housing and electrically coupled to the computing electronics. The handheld computer also includes a switch supported by the housing and electrically coupled to the computing electronics. Further, the handheld computer includes a microphone aperture disposed in the switch.

Another exemplary embodiment relates to a rocker switch configured to be used in a handheld computer. The rocker switch includes a first button portion associated with a first button direction and a second button portion associated with a second button direction. The rocker switch also includes a microphone aperture disposed in the rocker switch.

Further, an exemplary embodiment relates to a handheld computer. The handheld computer includes a housing, computing electronics supported by the housing, and a display supported by the housing and electrically coupled to the computing electronics. The handheld computer also includes a switch configured to provide user input to the handheld computer. The handheld computer also includes a microphone aperture disposed in the switch.

Further still, an exemplary embodiment relates to a handheld computer. The handheld computer includes a housing, computing electronics supported by the housing, and a display supported by the housing and electrically coupled to the computing electronics. The handheld computer also includes a first switch configured to provide user input to the handheld computer and a second switch configured to provide user input to the handheld computer. The first switch is adjacent the second switch. The handheld computer also includes a microphone aperture disposed adjacent the first switch and the second switch.

BRIEF DESCRIPTION OF THE DRAWINGS

The invention will become more fully understood from the following detailed description, taken in conjunction with the accompanying drawings, wherein like reference numerals refer to like elements, in which:

FIG. 1 is an exemplary depiction of a handheld computer having a switch with an integrated microphone aperture;

FIG. 2 is an exemplary depiction of the switch with an integrated microphone aperture of FIG. 1;

FIG. 3 is a cross sectional view of the switch taken across the line 3—3 in FIG. 2; and FIG. 4 is a depiction of a user utilizing the microphone aperture.

DETAILED DESCRIPTION OF THE EXEMPLARY EMBODIMENTS

Referring to FIG. 1, a handheld computer 100 is depicted, according to an exemplary embodiment. Handheld computer 100 may include Palm style computers manufactured by Palm, Inc., of Santa Clara, Calif. Other exemplary embodiments of the invention may include Windows CE™ handheld computers, or other handheld computers and personal digital assistants, as well as cellular telephones, and other mobile computing devices.

Preferably, handheld computer 100 includes interactive hardware and software that performs functions such as maintaining calendars, phone lists, task lists, notepads, calculator applications, spreadsheets, games, and other applications capable of running on a computing device. Further, handheld computer 100 may be configured for such functions as voice memo recording and playback as well as wireless telephony. Handheld computer 100, shown in FIG. 1 includes a plurality of input function keys 117 and a display 113 having graphical user interface features. Display 113 may be provided with a touch screen interface that allows a user to select and alter displayed content using a pointer, such as, but not limited to, a stylus. Referring again to FIG. 1, in an exemplary embodiment, display 113 also includes a Graffiti™ (or other handwriting recognition software) writing section 118 for tracing alphanumeric characters as input. A plurality of input buttons 119 for performing automated or preprogrammed functions may be provided on a portion of display 113. In a particular embodiment, display 113 is a touch screen display that is electronically responsive to movements of a stylus on the surface of display 113.

In an exemplary embodiment, handheld computer 100 may include an integrated antenna 120 for transmitting and receiving wireless communication signals, such as, but not limited to, cellular telephone communication signals. Antenna 120 may further include an indicator light 125 integrated into antenna 120 for indicating the transmission and reception of wireless communication signals. Further, light 125 may be used to indicate other states of handheld computer 100.

In an alternative embodiment first button portion 135 and second button portion 136 may be representative of two different individual switches. Aperture 140 is disposed between the two adjacent switches. The two individual switches may be similarly used for a variety of uses, including, but not limited to scrolling.

In an exemplary embodiment, handheld computer 100 also includes a navigation button shown as rocker switch 130. Rocker switch 130 may be utilized for navigating or scrolling of information displayed on display 113. For example, as depicted in FIG. 2, rocker switch 130 includes a first button portion 135 and a second button portion 136. First button portion 135 may be used for scrolling display 113 in the upward direction and, similarly, second button portion 136 may be used for scrolling information on display screen 113 in the downward direction. Further, first button portion 135 and second button portion 136 may be programmed for other uses depending on the application running on handheld computer 100. In an exemplary embodiment, a microphone aperture 140 is integrated into the rocker switch 130 of handheld computer 100.

Referring now to FIG. 3, rocker switch 130 is depicted having microphone aperture 140 extending through rocker switch 130 and terminating at a microphone 145 which is inside of a housing 150 of handheld computer 100. Microphone 145 receives audio signals (sound waves) through aperture 140 and communicates such audio signals in an electronic form over electrical connections 160 which are electrically coupled with computing electronics supported within housing 150.

Integrating microphone aperture 140 into a button or switch that already exists on handheld computer 100 has the advantage of saving physical space in hardware design. For example, both rocker switch 130 and microphone aperture 140 are combined into a single unit even though they provide two distinctly different functions. This savings of real estate on housing 150 helps allow small handheld computers to have microphone hardware included therein and further to provide handheld computers with such functionality as voice memo recording and voice telephony. Further, combining such distinctly different hardware into a single switch design allows handheld computing devices to be created in a smaller overall size. Further still, the combination of two functions/features into a single component may have the advantage of being less expensive for hardware design and manufacturing.

Referring now to FIG. 4, a user 200 is depicted holding a handheld device 100 having rocker switch 130 with integrated microphone aperture 140. As depicted, user 200 is utilizing handheld computer 100 for recording a voice memo or for voice telephony in which the sound waves created by user 200 are directed through microphone aperture 140 and converted to an electrical signal by microphone 145, as depicted in FIG. 3.

While the detailed drawings, specific examples and particular formulations given describe exemplary embodiments, they serve the purpose of illustration only. The hardware and software configurations shown and described may differ depending on the chosen performance characteristics and physical characteristics of the computing devices. For example, the type of computing device, input device buttons, or configuration used may differ. The systems shown and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A handheld computer, comprising:

a housing, computing electronics supported by the housing;

a display supported by the housing and electrically coupled to the computing electronics;

a switch supported by the housing and electrically coupled to the computing electronics; and a microphone aperture disposed in the switch.

2. The handheld computer of claim 1, further comprising:

a microphone pickup electrically coupled to the computing electronics and in audio communication with the microphone aperture.

3. The handheld computer of claim 1, wherein the switch is a pushbutton.

4. The handheld computer of claim 1, wherein the switch is configured to be used for scrolling on the display.

5. The handheld computer of claim 1, wherein the handheld computer is configured for telephony.

6. The handheld computer of claim 1, wherein the handheld computer is configured with voice recognition software.

7. A rocker switch configured to be used in a handheld computer, comprising:

a first button portion associated with a first button direction;

a second button portion associated with a second button direction; and a microphone aperture disposed in the rocker switch.

8. The rocker switch of claim 7, wherein the microphone aperture is disposed between the first button portion and the second button portion.

9. The rocker switch of claim 7, wherein the rocker switch is configured to scroll information on a display.

10. The rocker switch of claim 7, wherein the rocker switch is configured to be used in a handheld computer.

11. The rocker switch of claim 7, wherein the rocker switch is configured to be used in a telephony device.

12. A handheld computer, comprising:

a housing;

computing electronics supported by the housing;

a display supported by the housing and electrically coupled to the computing electronics;

a switch configured to provide user input to the handheld computer; and a microphone aperture disposed in the switch.

13. The handheld computer of claim 12, wherein the switch is a push button switch.

14. The handheld computer of claim 12, wherein the computing electronics include telephony electronics.

15. A handheld computer, further comprising:

a microphone in audio communication with the microphone aperture.

16. The handheld computer of claim 15, wherein the microphone is electrically coupled to the computing electronics.

17. The handheld computer of claim 12, wherein the switch includes two distinct sections configured to provide different input signals when actuated.

18. The handheld computer of claim 12, wherein the aperture is configured to provide a voice conduit to a microphone, through the housing.

19. A handheld computer, comprising:

a housing;

computing electronics suppoted by the housing;

a display supported by the housing and electrically coupled to the computing electronics;

a first switch configured to provide user input to the handheld computer;

a second switch configured to provide user input to the handheld computer, the first switch being adjacent the second switch; and a microphone aperture disposed adjacent the first switch and the second switch.

20. The handheld computer of claim 19, wherein the microphone aperture goes through the housing.

21. The handheld computer of claim 19, wherein the microphone aperture is disposed between the first switch and the second switch.

22. The handheld computer of claim 21, wherein the first switch is located above the second switch.

23. The handheld computer of claim 21, wherein the first switch is located to the left of the second switch.

* * * * *

UNITED STATES PATENT AND TRADEMARK OFFICE
CERTIFICATE OF CORRECTION

PATENT NO. : 6,697,639 B2  
DATED : February 24, 2004  
INVENTOR(S) : Scott R. Andress It is certified that error appears in the above-identified patent and that said Letters Patent is hereby corrected as shown below:

Column 4,  
Lines 10, 12, 22, 24, 52, 54 and 56, insert -- rocker -- before "switch".  
Line 59, delete "A" and insert therefor -- The --.

Column 5,  
Line 1, delete "15" and insert therefor -- 13 --.

Signed and Sealed this

Eleventh Day of October, 2005

JON W. DUDAS  
*Director of the United States Patent and Trademark Office*